D. PERRIN.
Cutters for Tonguing and Grooving Lumber.
No. 137,861. Patented April 15, 1873.
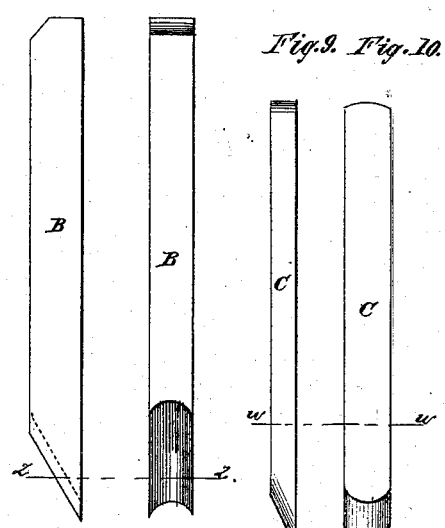
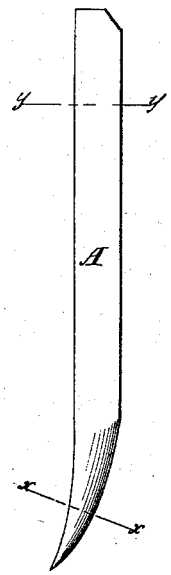
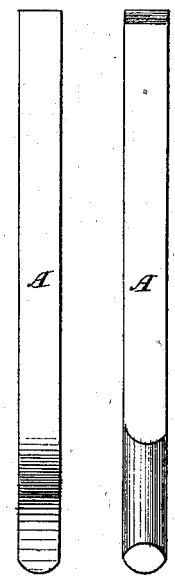
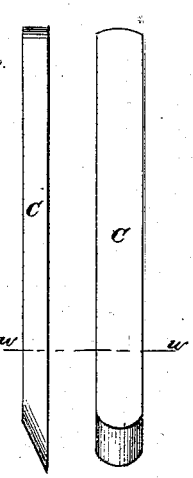
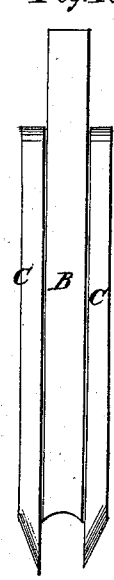
Witnesses:
Inventor:
D. Perrin
PER Attorneys.

UNITED STATES PATENT OFFICE.

DANIEL PERRIN, OF McGREGOR, IOWA.

IMPROVEMENT IN CUTTERS FOR TONGUING AND GROOVING LUMBER.

Specification forming part of Letters Patent No. 137,861, dated April 15, 1873; application filed December 14, 1872.

*To all whom it may concern:*

Be it known that I, DANIEL PERRIN, of McGregor, in the county of Clayton and State of Iowa, have invented a new and useful Improvement in Cutters for Tonguing and Grooving Lumber, of which the following is a specification:

Figure 1 is a side view of a crooked groove cutter or bit. Fig. 2 is a front view of the same. Fig. 3 is a rear view of the same. Fig. 4 is a detail cross-section of the same, taken through the line $x\,x$, Fig. 1. Fig. 5 is a detail cross-section of the same taken through the line $y\,y$, Fig. 1. Fig. 6 is a side view of a cutter for rounding the tongue. Fig. 7 is a rear view of the same. Fig. 8 is a detail cross-section of the same taken through the line $z\,z$, Figs. 6 and 7. Fig. 9 is a side view of one of the cutters for trimming off the sides of the tongues and grooves. Fig. 10 is a rear view of the same. Fig. 11 is a detail cross-section of the same taken through the line $w\,w$, Figs. 9 and 10. Fig. 12 represents a pair of cutters arranged for trimming the sides of a groove. Fig. 13 represents a set of cutters arranged for rounding a tongue and trimming its sides.

Similar letters of reference indicate corresponding parts.

My invention has for its object to furnish improved cutters, spurs, or trimmers for matching tongued and grooved lumber, which will enable more and better work to be done with less expense and less wear and strain upon the machine than when the ordinary cutters are used. The invention consists in the cutters for trimming off the sides of the groove and tongue, made of equal breadth with and of half the thickness of the other cutters to adapt them to be used in pairs, as hereinafter fully described.

A represents a cutter, curved at the point, which I prefer to employ for forming the groove, as shown in Fig. 1, and rounded off upon the rear side of its cutting part, as shown in Figs. 1 and 3. B is a cutter I employ for rounding the tongue, the incline of the cutting part of which is grooved longitudinally, as shown in Figs. 6, 7, and 8. C represents the spurs or cutters for trimming the sides of the groove and tongue. The cutters C are made of exactly the same breadth as the cutters A B, as shown in Figs. 2, 3, 5, 7, 8, 10, and 11, and of exactly half the depth or thickness of said cutters, as shown in Figs. 9, 10, 11, so that when two of them are put together, as shown in Fig. 12, the two may exactly equal in size one of the said cutters A B, and may fit into the same slot in the cutter-head. For trimming off the sides of the groove two of the cutters C are put together with the inclines of their cutting parts toward each other, as shown in Fig. 12, and they will trim or shave off the sides of the groove smoothly, removing the fuzz or strings that will gather upon cross-grained or green lumber from the action of the grooving-tool. For rounding off the tongue and trimming its sides one of the cutters C is placed upon each side of the grooved cutter B, with their inclines from said cutter B or outward, as shown in Fig. 13; and the set of cutters will thus trim or shave off the top and sides of the tongue smoothly and uniformly. The other bits that cut above the groove remain the same as in the ordinary grooving-head; but in the tonguing-head the thickness of one spur or cutter, C, is taken off the upper and lower bits to keep the head in balance, and to let the spurs C up to the cutter B; or the thickness of one spur, C, may be taken off the lower bit, the upper bit being put in the same, and something may be put in the other slots to balance the head. In the spur-slots of the tongue-head the upper and lower bits are set back, so that the spurs can be sharpened without taking down the cutter-head until all the bits require to be ground.

Having thus described my invention, I claim as new and desire to secure by Letters Patent—

The cutters C, made of equal breadth with, and of half the depth or thickness of, the cutters A B, to adapt them to be used in pairs, as herein shown and described, and for the purposes set forth.

DANIEL PERRIN.

Witnesses:
A. BURLINGAME,
H. W. BURLINGAME.